United States Patent [19]

Cartlidge et al.

[11] Patent Number: 4,953,052
[45] Date of Patent: Aug. 28, 1990

[54] POLE SLIP PROTECTION CIRCUIT FOR PARALLELED GENERATORS

[75] Inventors: Norman Cartlidge; Luiz Andrade, both of Rockford; James Thom, Freeport, all of Ill.

[73] Assignee: Sundstrand Corporation, Rockford, Ill.

[21] Appl. No.: 381,855

[22] Filed: Jul. 19, 1989

[51] Int. Cl.$^5$ ............................................. H02H 7/06
[52] U.S. Cl. ...................................... 361/20; 307/87; 307/129; 322/32
[58] Field of Search ............... 361/20, 62, 78; 307/44, 307/64, 62, 84, 85, 86, 87, 129

[56] References Cited

U.S. PATENT DOCUMENTS

| | | | |
|---|---|---|---|
| 4,308,465 | 12/1981 | Lafuze | 307/87 |
| 4,376,295 | 3/1983 | Uenosono et al. | 361/21 |
| 4,403,292 | 9/1983 | Ejzak et al. | 307/19 X |
| 4,488,198 | 12/1984 | Christen et al. | 361/20 |
| 4,575,671 | 3/1986 | Lee et al. | 307/84 |
| 4,684,873 | 8/1987 | Glennon | 307/84 |

Primary Examiner—Derek S. Jennings
Attorney, Agent, or Firm—Antonelli, Terry, Stout & Kraus

[57] ABSTRACT

A protection system (80) for a first generator unit (12) connectible by a first switch (24) to a power generating system having at least one additional generator unit with the at least one additional generator unit being connectible in parallel to the first generator unit with the first switch being opened in response to a first control signal to enable the first generator unit to be disconnected from the parallel connection to the at least one additional generator unit in accordance with the invention includes a signal generator (12) for generating a reference signal having a frequency proportional to a frequency of a voltage generated by the first generator unit; a sensor (14) for sensing a common frequency at a point of reference of voltage generated by the generator units of the power generating system; and a controller (14) responsive to the signal generator and the sensor, for calculating a difference between the frequency of the reference signal and the common frequency and for generating the first control signal in response to the difference being greater than a threshold.

21 Claims, 2 Drawing Sheets

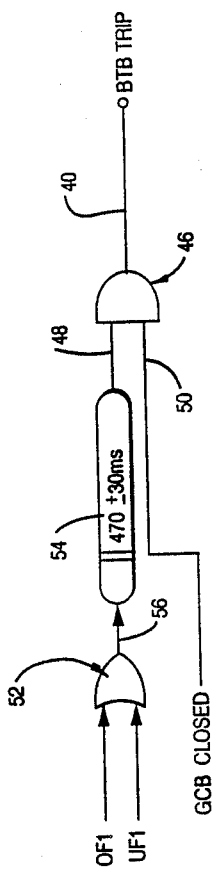
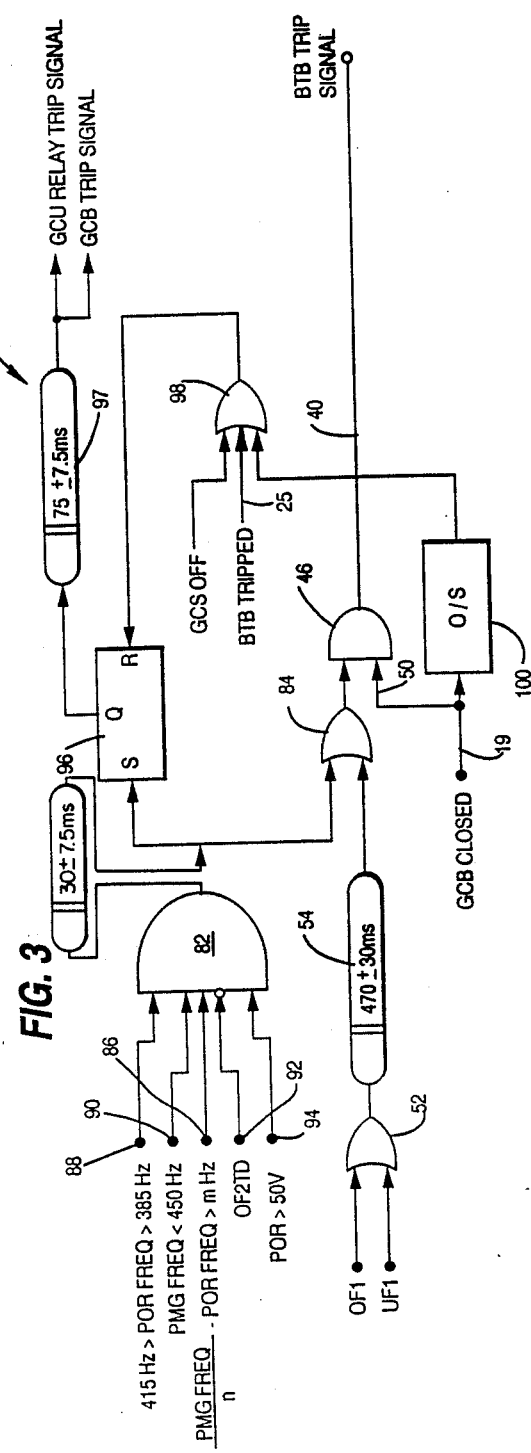
FIG. 2
PRIOR ART
FIG. 3

POLE SLIP PROTECTION CIRCUIT FOR PARALLELED GENERATORS

Technical Field

The present invention relates to a system for isolating a generator which is connected in parallel with other generators in a power generating system and which is attempting to operate asynchronously with respect to the frequency of power being generated by the system.

Background Art

FIG. 1 illustrates a prior art power generating system of the type manufactured by the assignee of the present invention for use in airframes. The power generating system 10 is comprised of a plurality of generating units 12 each of which are coupled to a power take-off (not illustrated) from an airframe propulsion engine. Each generating unit 12 is conventional and is comprised of a permanent magnet generator which generates alternating current which is rectified and applied to a wound field exciter which produces alternating current which is rectified and applied to the rotor of a three phase alternator. As indicated by the numeric designation 1...n associated with each generator unit, the number of generator units varies directly with the number of engines in the airframe and typically is between 2 and 4. The rotor of the three phase alternator is driven by a constant speed transmission (not illustrated) which converts a variable speed power take-off from the airframe propulsion engine into a constant speed shaft drive which rotates the rotor of the three phase alternator at a velocity for producing three phase 400 Hz electrical power. Each generator unit 12 has an associated generator control unit 14 which contains a programmed microprocessor for implementing various conventional control and protection functions as well as functions which are described below which are part of the present invention. Further examples of electrical generating systems for an airframe are disclosed in U.S. Pat. Nos. 4,403,292, 4,488,198 and 4,684,873 which are assigned to the assignee of the present invention.

Generator control unit 14 is conventional. The generator control unit 14 contains a relay which controls the connection of electrical power generated by the permanent magnet generator to the wound field exciter which upon disconnection disables the generator unit from generating electrical power. A generator control current transformer 16 monitors the current generated by its associated generator unit 12. The generator control unit 14 uses the information from the generator control current transformer 16 and the system average current to determine the difference in current outputted by the associated generator unit 12 and the system average. Each generator control current transformer 16 is comprised of eight different current sensing windings. A generator control breaker 18 connects the generator to the load bus 20. A bus tie breaker 24 connects the generator control breaker 18 to the system power bus 26. The bus tie breaker 24 opening and closing is controlled by first signals on line 40 and the opening and closing of the generator control breaker 18 is controlled by second signals on line 22. The generator control breaker 18 and the bus tie breaker 24 may have different implementations which are responsive to first and second levels of a single signal or to multiple signals having multiple levels. A split system breaker 28 permits division of the system power bus 26 into two parts to permit independent operation of groups of one or more generator units 12 in parallel. One or more bus control units 30 provide control over the split system breaker 28. Furthermore, each bus control unit 30 may issue commands over control lines 32 to one or more generator control units 14 over which the bus control unit exercises supervisory control to control the switching status of either or both of the generator control breaker 18 and bus tie breaker 24. The bus control units 30 also provide additional system protection not discussed herein through communications and hardware lines not illustrated.

The switching status of the bus tie breaker 24 is dependent upon a number of system conditions. When the generator control unit includes a microprocessor, the opening of the bus tie breaker 24 occurs when a calculated effective frequency "eff freq" respectively exceeds or is less than an upper and lower frequency limit OF1 and UF1 which respectively are 427.5 Hz and 372.5 Hz. A signal is applied on line 40 by the generator control unit to command the opening of the bus tie breaker 24 when the effective frequency is greater than or equal to OF1 or less than or equal to UF1 for a predetermined time. The effective frequency is defined as follows:

$$\mathit{eff\ freq} = F_o + KI_{DFA}$$

wherein $F_o$ is the frequency of the voltage at the point of reference, K is a constant and $I_{DFA}$ is a positive or negative current representative of the difference between the average current generated by all the generator units 12 in the system and the actual current generated by the generator unit controlled by the generator control unit 14 calculating the effective frequency. A positive value of $I_{DFA}$ indicates that the generating unit 12 is contributing more than the average current and a negative value indicates that the generating unit is contributing less than the average current. If the calculated effective frequency is less than OF1 and greater than UF1, the bus tie breaker does not open. The generator control unit 14 applies a first control signal to line 40 to open the bus tie breaker 24 and subsequently a second control signal to line 22 to open the generator control breaker 18 if the limits OF1 and UF1 are exceeded for at least 0.47 and 1.2 seconds, respectively. The bus tie breaker 24 will auto-reclose after the generator control breaker 18 trips.

The generator control unit 14 also determines if the frequency of the voltage generated by the associated generator unit 12 is either greater than a frequency limit OF2 which may be 435–440 Hz or less than a lower frequency limit UF2 which may be 350–355 Hz. If the lower limit UF2 is exceeded for more than 100–200 msec. the generator control unit 14 causes the generator control breaker 18 to be opened by generating the control signal on line 22. If the upper frequency OF2 is exceeded for more than 20–40 msec. the generator control unit 14 causes the generator control breaker 18 to be opened by generating the control signal on line 22.

FIG. 2 illustrates a prior art logic circuit utilized in a power generating system manufactured by the assignee of the present invention for controlling the opening of the bus tie breaker 24. The control signal for the bus tie breaker 24 is generated by AND gate 46 which has a first input 48 and a second input 50 and output 40. The first input 48 is generated by the combination of OR gate 52 and delay 54. OR gate 52 has a first input OF1 which corresponds to the result of the comparison of effective frequency "eff freq" calculated by the generator control unit 14 to the threshold OF1 described above. The signal OF1 is high when the calculated frequency is equal to or greater than the limit 427.5 Hz for a predetermined time. The OR gate 52 also has a second input UF1 which corresponds to the result of the comparison of the effective frequency "eff freq" calculated by the generator control unit 14 to the threshold UF1 described above. The signal level on the input UF1 is high when the calculated frequency is equal to or less than UF1 limit 372.5 Hz for a predetermined time. The output 56 of OR gate 52 is applied to delay 54. The delay 54 outputs a high level signal state only when the signal at output 56 is high for at least a time interval equal to 470 msec. plus or minus 30 msec. Accordingly, the signal commanding the opening of the bus tie breaker 24 generated by the output of AND gate 46 is high when the inputs 48 and 50 are high. The logic circuit of FIG. 2 does not control system protection for guarding against pole slip as described below.

It is necessary to protect a power generating system containing a plurality of generating units which are connected in parallel against pole slip which is the asynchronous operation of any one of the generating units with respect to the common frequency of the system. Pole slip can cause a number of problems. First, extensive oscillation of the power supply voltage and frequency can occur on all AC load buses and on all AC dependent DC load buses. Second, protective tripping of bus tie breakers 24 can occur in both faulted and non-faulted channels as a consequence of the faulted channel oscillating below the under excitation threshold UE and the non-faulted channels oscillating around the over excitation protection threshold OE. If overexcitation trips do not occur, then the oscillation continues for the duration of the underexcitation time delay which cannot be reduced because of coordination requirements with downstream protective devices. Pole slipping can stop within the aforementioned time delay if at least one of the non-faulted channels tie breakers 24 trip upon overexcitation. In the worst case the oscillation can continue for the entire UE time delay resulting in the power generating system operating with all channels isolated as a consequence of all of the bus tie breakers 24 being tripped. Proper detection of pole slipping results in the opening of the bus tie breaker 24 of the faulty channel which prevents the aforementioned problems.

In the prior art a number of solutions have been utilized to prevent pole slipping. In the power generating units an overrunning clutch was provided to handle both overspeed and underspeed constant speed drive operation. This clutch caused an automatic disconnection until proper synchronous operation was restored. The clutch had the disadvantages of being a weight penalty to the airframe and suffered from poor reliability. Subsequently the overrunning clutch was eliminated with the generator control unit 14 detecting if its associated generator unit was acting as a motor. If the generator unit 12 was detected as acting as motor for a predetermined time then the bus tie breaker 24 was tripped to prevent sustained motoring. The problem with this solution was that an overspeeding generating unit 24 could pole slip (previously prevented by the clutch).

Disclosure of the Invention

The present invention provides an improved pole slip protection system for electrical power generating systems of the type illustrated in FIG. 1 having a plurality of generating units connected in parallel to protect the system against operation in which one of the generating units is attempting to generate power at a frequency above the synchronous frequency of the power generated by the system. With the invention a bus tie breaker of the faulted channel is opened upon detection of the difference between a reference signal generated by a generating unit which is proportional to the generating unit mechanical rotational velocity and a common frequency of voltage at a point of reference generated by the generator units of the power generating system being greater than a threshold. Preferably, the reference frequency is the waveform generated by a permanent magnet generator associated with the generating unit which provides an accurate measurement of the speed of operation of the generating unit independent of the common frequency of voltage being generated by the generating system. The pole slip protection provided by the present invention for each of the generating units within a generating system permits overspeeding generating units to be shed from the common system power bus to prevent bad power quality (severe oscillation) for the duration of a time delay (UE) and provides selective isolation of the associated generating unit from the tie bus. If the overspeed fault persists then the associated generating control unit trips a generator control breaker through overfrequency protection and reconnects the bus tie breaker to permit power to be applied to the load which was isolated from the system power bus upon opening of the bus tie breaker.

As used herein, a control signal is a signal level which causes a specified switching state to occur in a breaker in an electrical power generating system. A single control line may deliver two control signals which are first and second voltage levels. Alternatively, two control lines may respectively deliver single control signals with each control signal being a predetermined voltage level.

A protection system for a first electrical generator unit connectible by a first switch to a power generating system having at least one additional generator unit with the at least one additional generator unit being connectible in parallel to the first generator unit with the first switch being opened in response to a first control signal to enable the first generator unit to be disconnected from the parallel connection to the at least one additional generator unit in accordance with the invention includes a signal generator for generating a reference signal having a frequency proportional to a frequency of voltage generated by the first generator unit; a sensor for sensing a common frequency of voltage generated by the generator units of the power generating system; and a controller, responsive to the signal generator and the sensor, for calculating a difference between the frequency of the reference signal and the common frequency and for generating the first control signal in response to the difference being greater than a threshold.

Further in accordance with the invention a power bus connects the first generator unit and the at least one additional generator unit in parallel; and a second switch is connected in series between the first generator unit and the first switch with the second switch being opened in response to a second control signal for disconnecting the first generator unit from the power bus with the controller generating the second control signal in response to at least one predetermined operating condition of the first generator unit. The first signal may be generated as a function of the frequency of an excitation current generated by the first generator unit. Preferably, the first generator unit comprises a permanent magnet generator which excites a wound field exciter which excites a three phase alternator; and the first signal is generated as a function of the frequency of excitation current generated by the permanent magnet generator The first control signal is generated when $$\frac{f_r}{n} - f_{por} > m$$

wherein $f_r$ is the reference frequency, n is a real positive number, m is the difference which is a predetermined positive number and $f_{por}$ is the common frequency. Preferably, $f_r$ is the frequency of the waveform generated by the permanent magnet generator in the first generator unit.

In a preferred embodiment, generation of the first control signal does not occur unless one or more other system states are present. The system states which may be used to qualify the generation of the first signal after the difference between the reference frequency and the common frequency exceeds the threshold for a predetermined time interval include the frequency of the voltage at a point of reference being less than a maximum frequency and greater than a minimum frequency; the frequency of the reference signal being less than a maximum; the frequency of the voltage generated by the first generator unit not being greater than a maximum; and a magnitude of the common voltage being greater than a predetermined level.

The controller comprises a gate having first and second inputs and an output and producing the first control signal on the output in response to a signal applied to the first input indicating the second switch is closed and a signal applied to the second input which is high when the difference is greater than the threshold or in response to when a calculated frequency is greater than a first predetermined frequency or less than a second predetermined frequency. The controller further comprises a flip flop having set and reset inputs and an output assuming a first level in response to a signal being applied to the set input and assuming a second level in response to a signal being applied to the reset input, the set input having the signal applied thereto in response to the difference being greater than the threshold, the reset input having the signal applied thereto in response to a pulse generated in response to the second switch being closed, the first switch not being closed or the first generating unit not generating electrical power.

A method of protecting an electrical power generating system comprised of a first generator unit connectible by a closed switch in parallel to at least one additional generator unit in accordance with the invention comprises generating a reference signal having a frequency proportional to a frequency of a voltage generated by the first generator unit; sensing a common frequency of voltage generated by the generator units of the power generating system; and calculating a difference between the reference signal and the common frequency and in response to the difference being greater than a threshold opening the first switch to disconnect the first generating unit from the at least one additional generating unit. The reference signal is preferably generated by a permanent magnet generator contained within the first power generating unit. Preferably, the first switch is opened when $$\frac{f_r}{n} - f_{por} > m$$

with $f_r$ being the reference frequency, n being a real positive number, m being the difference which is a predetermined positive number and $f_{por}$ is the common frequency.

Brief Description of the Drawings

FIG. 2 illustrates a logic diagram of a prior art control for a bus tie breaker of the type illustrated in the power generating system of FIG. 1.

FIG. 3 illustrates a logic diagram of a pole slip protection system in accordance with the present invention.

Figure 1:
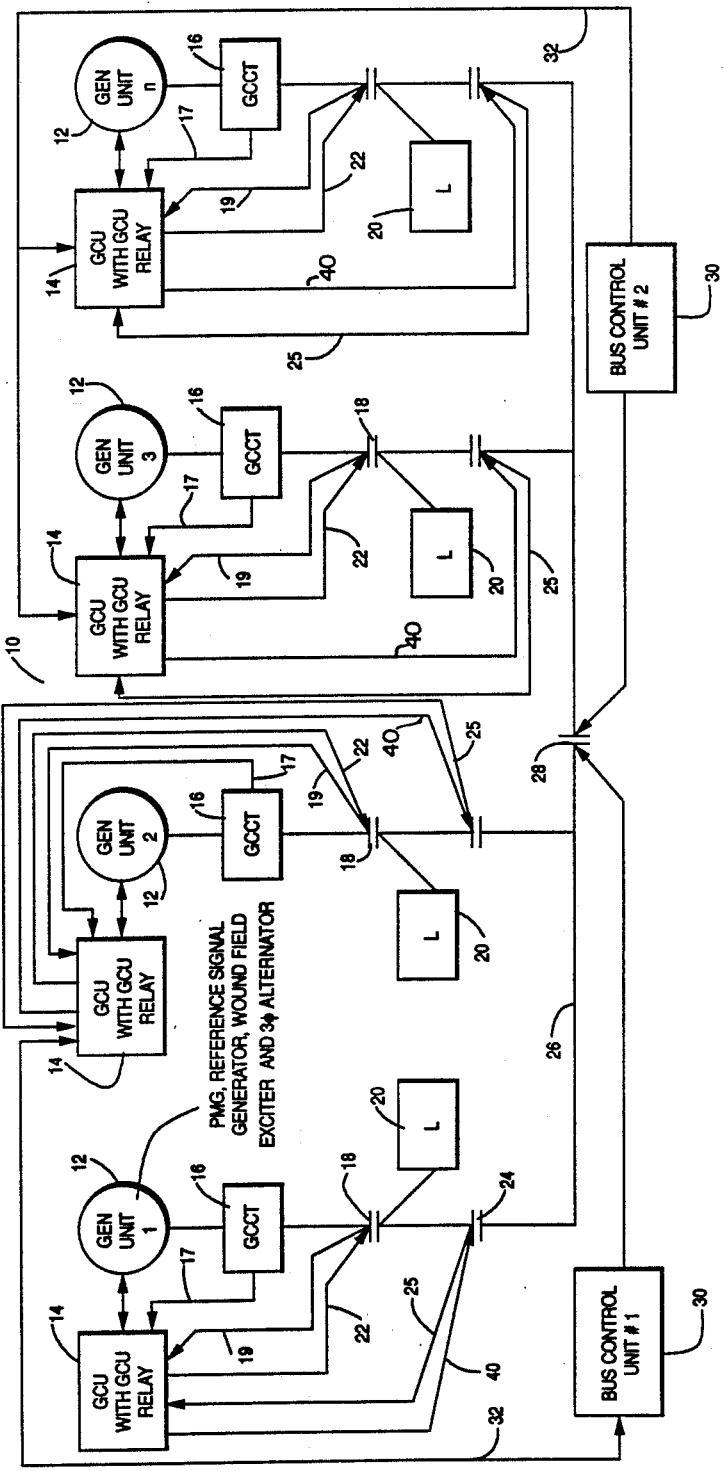
FIG. 1 illustrates a block diagram of a prior art aircraft power, generating system of the type manufactured by the assignee of the present invention.

Best Mode for Carrying Out the Invention

FIG. 3 illustrates an embodiment of a pole slip protection system 80 in accordance with the present invention. Like reference numerals identify like parts in FIGS. 2 and 3. The pole slip protection system 80 of the present invention is preferably implemented within a generator control unit 14 of the type illustrated in FIG. 1 which utilizes a programmed microprocessor or other suitable processor. The logic functions contained in the pole slip protection system may be implemented in hardware or software or combinations thereof. The pole slip protection system 80 of the present invention functions to disconnect a power generating unit 12 of the type illustrated in the prior art of FIG. 1 which is operating in a faulted overspeed condition which exceeds a threshold which is equal to a difference between a reference frequency generated by the power generating unit which is operating in the overspeed condition that is proportional to the rotational velocity of the overspeed power generating unit and a common frequency of voltage at a point of reference generated by at least a pair of power generating units including the power generating unit operating at an overspeed condition that are connected in electrical parallel to each other. When the difference threshold is exceeded indicative of pole slip, the bus tie breaker 24 as described above with reference to FIG. 1 is opened to disconnect the power generating unit 12 which is operating at an overspeed condition from the system power bus 26. Preferably the overspeed condition must be present for a predetermined time interval before the bus tie breaker 24 is opened. Furthermore, if the bus tie breaker 24 fails to trip and the pole slip condition persists for an additional time interval longer than the predetermined time interval necessary for opening the bus tie breaker 24 in accordance with the invention, the generator control breaker 18 is opened and the bus tie breaker is kept closed.

Further in accordance with a preferred embodiment of the present invention, opening of the bus tie breaker 24 is further qualified by requiring the overspeed condition to be present for the predetermined time interval and further one or more additional system states must be present before the bus tie breaker is opened. Preferably, a plurality of the aforementioned system states must be present before the bus tie breaker is opened.

The logic circuit of FIG. 3 is a modification of the prior art logic circuit of FIG. 2. The circuit of FIG. 2 has been modified to incorporate a pole slip protection system used for generating a first signal which is a BTB TRIP SIGNAL which causes the bus tie breaker 24 to open and a signal which is an inverse of the BTB TRIP SIGNAL to cause the bus tie breaker 24 to close. Additionally, the signal state necessary to generate the first signal of the bus tie breaker 24, after a longer period of delay, is used to generate a second signal which is a GCB TRIP SIGNAL for causing the generator control breaker 18 to open. The GCB TRIP SIGNAL causes auto closure of the bus tie breaker 24.

Generation of the BTB TRIP SIGNAL, which causes the bus tie breaker 24 to open, is controlled by a plurality of signal states. In order to enable the generation of a BTB TRIP SIGNAL it is necessary for the generator control breaker 18 to be closed as signalled by line 19 which causes a high level signal on input 50 of AND gate 46. A first variable condition for causing the BTB TRIP SIGNAL to be generated is the presence of the OF1 signal or the UF1 signal produced as discussed above with reference to the prior art when the calculated effective frequency exceeds either the threshold OF1 or UF1. If either one of the aforementioned OF1 or UF1 signals are high for a period longer than 470 msec. plus or minus 30 msec. the aforementioned BTB TRIP SIGNAL will be generated. Generation of the BTB TRIP SIGNAL as a consequence of a detection of pole slipping is controlled by the output of AND gate 82 which is a first input to OR gate 84 which has a second input which is the output of the aforementioned signal delay 54.

In a preferred embodiment five separate signal states must be present for a predetermined time interval of 30±7.5 msec. produced by delay 102 to cause the generation of a BTB TRIP SIGNAL which opens the bus tie breaker 24 in response to the detected pole slip condition. The first signal state is the presence of a high level signal on input 86 in which the frequency of alternating voltage produced by the permanent magnet generator of the generator unit 12 divided by n which is a real positive number, minus the common frequency of alternating current at a point of reference such as is sensed by the GCU 14 on line 19 is greater than a threshold frequency m. Sensing of the common frequency of current at a point of reference is performed by the generator control unit counting a number of cycles of voltage occurring over a fixed time interval or by other known techniques. As an example of the values of the variables n and m, n may be equal to 3 and is determined as a function of the number of poles of the permanent magnet generator and m may be equal to 7. In order to provide a higher reliability that the system is operating in a pole slip condition which requires opening of the bus tie breaker 24, four additional inputs 88, 90, 92 and 94 are provided to AND gate 82. The input 88 is high when the point of reference frequency such as at the generator control breaker 18 is less than 415 Hz and greater than 385 Hz. The input 90 is high when the frequency of current produced by the permanent magnet generator of the generator unit 12 is less than 450 Hz. The input 92 is high when the frequency of generated voltage produced by the generator unit 12 is not above OF2 as described above. The input 94 is high when the voltage of a point of reference such as at the generator control breaker 18 is greater than 50 volts. While preferably, four additional signal states are utilized to qualify the trueness of the condition determined by the calculation of the difference between the permanent magnet generator frequency less the frequency at a point of reference, it should be understood that the invention maybe practiced without any of the aforementioned additional qualifying signal states or any combination of one or more of the aforementioned signal states or other qualifying signal states.

Flip-flop 96 controls the tripping of the generator control unit relay within the generator unit 12 in response to the system state outputted by the AND gate 82 indicative of a pole slip. Flip-flop 96 is set in response to a high level output signal from the AND gate 82 via delay 102 to cause the Q output signal to go high. If the Q output is high for 75±7.5 msec. a GCU RELAY TRIP SIGNAL and a GCB TRIP SIGNAL is generated by delay 97 which causes the disconnection of excitation current generated by the permanent magnet generator of the generator control unit from the wound field exciter therein to disable the generation of electrical power by the generator unit 12 which has the overspeed pole slip condition. Flip-flop 96 is reset by a high level output from OR gate 98 which is produced in reference to a high signal on any one of three inputs which are a GCS OFF input which is high in response to generator unit 12 not generating electrical power, a BTB TRIPPED signal which is high in response to the bus tie breaker 24 being tripped, and a pulse generated by one shot multivibrator 100 in response to a trailing edge of a signal generated when the generator control breaker 18 transitions from the closed state to the open state. AND gate 46 controls the tripping of the bus tie breaker 24 in response to a high level output signal from the AND gate 82 via delay 102 and to the generator control breaker 18 being closed. Delay 97 is chosen to enable the bus tie breaker 24 to open first and thereafter allow the generator control breaker 18 to open if the bus tie breaker 24 failed to open which causes the output of AND gate 46 to go low to keep the bus tie breaker 24 closed to permit power to be applied to loads connected between the generator control breaker 18 and the bus tie breaker 24.

While the preferred embodiment of the present invention is utilized in electrical power generating systems for use in airframes, it should be understood that the present invention may be utilized in any electrical power generating system which has a plurality of generating units connected in electrical parallel which are intended to be synchronously operated for disconnecting of any generating unit which is operating at an overspeed condition from remaining units in the electrical power generating system.

While the invention has been described in terms of its preferred embodiments, it should be understood that numerous modifications may be made thereto without parting from the spirit and scope of the invention as defined in the appended claims. It is intended that all such modifications fall within the scope of the appended claims.

We claim:

1. A protection system for a first generator unit connectible by a first switch to a power generating system having at least one additional generator unit with the at least one additional generator unit being connectible in parallel to the first generator unit with the first switch being opened in response to a first control signal to enable the first generator unit to be disconnected from the parallel connection to the at least one additional generator unit comprising:

a signal generator for generating a reference signal having a frequency proportional to a frequency of voltage generated by the first generator unit;

a sensor for sensing a common frequency at a point of reference of voltage generated by the generator units of the power generating system; and a controller, responsive to the signal generator and the sensor, for calculating a difference between the frequency of the reference signal and the common frequency and for generating the first control signal in response to the difference being greater than a threshold.

2. A protection system in accordance with claim 1 further comprising:

a power bus connecting the first generator unit and the at least one additional generator unit in parallel;

a second switch connected between the first generator unit and the first switch with the second switch being opened in response to a second control signal for disconnecting the first generator unit from the power bus; and wherein the controller generates the second control signal in response to at least one predetermined operating condition of the first generator unit.

3. A protection system in accordance with claim 1 wherein:

the first signal is generated as a function of the frequency of an excitation current generated by the first generator unit.

4. A protection system in accordance with claim 1 wherein:

the first generator unit comprises a permanent magnet generator which excites a wound field exciter which excites a three phase alternator; and the first signal is generated as a function of the frequency of the excitation current generated by the permanent magnet generator.

5. A protection system in accordance with claim 1 wherein:

the first signal is generated when $$\frac{f_r}{n} - f_{por} > m$$

with $f_r$ being the reference frequency, n being a real positive number, m being the difference which is a predetermined positive number, and $f_{por}$ being the common frequency at a point of reference.

6. A protection system in accordance with claim 5 wherein:

$f_r$ is the frequency of current generated by a permanent magnet generator in the first generator unit.

7. A protection system in accordance with claim 2 wherein:

the first signal is generated when $$\frac{f_r}{n} - f_{por} > m$$

with $f_r$ being the reference frequency, n being a real positive number, m being the difference which is a predetermined positive number, and $f_{por}$ being the common frequency at a point of reference.

8. A protection system in accordance with claim 3 wherein:

the first signal is generated when $$\frac{f_r}{n} - f_{por} > m$$

with $f_r$ being the reference frequency, n being a real positive number, m being the difference which is a predetermined positive number, and $f_{por}$ being the common frequency at a point of reference.

9. A protection system in accordance with claim 4 wherein:

the first signal is generated when $$\frac{f_r}{n} - f_{por} > m$$

with $f_r$ being the reference frequency, n being a real positive number, m being the difference which is a predetermined positive number, and $f_{por}$ is the common frequency at a point of reference.

10. A protection system in accordance with claim 1 wherein:

the first control signal is generated in response to the difference being greater than the threshold for a predetermined time interval and the common frequency at the point of reference being less than a maximum frequency and greater than a minimum frequency.

11. A protection system in accordance with claim 1 wherein:

the first control signal is generated in response to the difference being greater than the threshold for a predetermined time interval and a frequency of the reference signal being less than a maximum.

12. A protection system in accordance with claim 1 wherein:

the first control signal is generated in response to the difference being greater than the threshold for a predetermined time interval and a frequency of the generated voltage not being greater than a maximum.

13. A protection system in accordance with claim 1 wherein:

the first control signal is generated in response to the difference being greater than the threshold for a predetermined time interval and a magnitude of a voltage of electrical power generated by the first generator unit being greater than a predetermined voltage.

14. A protection system in accordance with claim 1 wherein:

the first control signal is generated in response to the difference being greater than the threshold for a predetermined time interval, the common frequency at the point of reference being less than a maximum frequency and greater than a minimum frequency, a frequency of the reference signal being less than a maximum, the frequency of the voltage generated by the first generator unit not being greater than a maximum frequency and a magnitude of the voltage generated by the first generator unit being greater than a predetermined voltage.

15. A protection system in accordance with claim 2 wherein the controller further comprises:

a gate having first and second inputs and an output and producing the first control signal on the output in response to a signal applied to the first input indicating the second switch is closed and a signal applied to the second input occurring when the difference is greater than the threshold or in response to when the frequency of the generated voltage is greater than or less than a predetermined calculated frequency.

16. A protection system in accordance with claim 15 wherein the controller further comprises:

a flip-flop having set and reset inputs and an output assuming a first level in response to a signal being applied to the set input and assuming a second level in response to a signal being applied to the reset input, the set input having the signal applied thereto in response to the difference being greater than the threshold and the reset input having the signal applied thereto in response to a pulse generated in response to the second switch being closed, the first switch not being closed or the first generator unit being turned off.

17. A protection system in accordance with claim 7 wherein the controller further comprises:

a gate having first and second inputs and an output and producing the first control signal on the output in response to a signal applied to the first input indicating the second switch is closed and a signal applied to the second input occurring when the difference is greater than the threshold or in response to when the frequency of the generated voltage is greater than or less than a predetermined calculated frequency.

18. A protection system in accordance with claim 17 wherein the controller further comprises:

a flip-flop having set and reset inputs and an output assuming a first level in response to a signal being applied to the set input and assuming a second level in response to a signal being applied to the reset input, the set input having the signal applied thereto in response to the difference being greater than the threshold and the reset input having the signal applied thereto in response to a pulse generated in response to the second switch being closed, the first switch not being closed or the first generator unit being turned off.

19. A method of protecting an electrical power generating system comprised of a first generator unit connectible by a closed switch in parallel to at least one additional generator unit comprising:

generating a reference signal having a frequency proportional to a frequency of a voltage generated by the first generator unit;

sensing a common frequency of voltage generated by the generator units of the power generating system; and calculating a difference between the reference signal and the common frequency and in response to the difference being greater than a threshold opening the first switch to disconnect the first generating unit from the at least one additional generator unit.

20. A method in accordance with claim 19 wherein: the reference signal is generated by a permanent magnet generator within the first generator unit.

21. A method in accordance with claim 19 wherein: the first switch is opened when $$\frac{f_r}{n} - f_{por} > m$$

with $f_r$ being the reference frequency, n being a positive real number, m being the difference which is a predetermined positive number, and $f_{por}$ is the common frequency at a point of reference.

* * * * *